United States Patent
Taherzadeh Boroujeni et al.

(10) Patent No.: US 11,889,498 B2
(45) Date of Patent: Jan. 30, 2024

(54) INDICATION OF CONTROL CHANNEL REPETITION FACTOR

(71) Applicant: QUALCOMM Incorporated, San Diego, CA (US)

(72) Inventors: Mahmoud Taherzadeh Boroujeni, San Diego, CA (US); Xiaoxia Zhang, San Diego, CA (US); Tao Luo, San Diego, CA (US); Wooseok Nam, San Diego, CA (US); Iyab Issam Sakhnini, San Diego, CA (US); Jelena Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 57 days.

(21) Appl. No.: 17/444,641

(22) Filed: Aug. 6, 2021

(65) Prior Publication Data

US 2023/0041930 A1   Feb. 9, 2023

(51) Int. Cl.
*H04W 72/1263* (2023.01)
*H04W 72/20* (2023.01)
(Continued)

(52) U.S. Cl.
CPC ....... *H04W 72/1263* (2013.01); *H04L 1/0003* (2013.01); *H04L 1/1896* (2013.01);
(Continued)

(58) Field of Classification Search
CPC ......... H04W 72/1263; H04W 72/1242; H04W 72/1247; H04W 72/1257; H04W 72/1278;
(Continued)

(56) References Cited

U.S. PATENT DOCUMENTS

2019/0149365 A1* 5/2019 Chatterjee ............. H04L 5/0044
                                                                370/329
2021/0051650 A1* 2/2021 Yi ...................... H04W 72/0413
(Continued)

FOREIGN PATENT DOCUMENTS

CN         115189848 A  * 10/2022
WO    WO-2022067549 A1 *  4/2022
(Continued)

OTHER PUBLICATIONS

International Search Report and Written Opinion—PCT/US2022/074203—ISA/EPO—dated Oct. 19, 2022.
(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive a physical downlink control channel (PDCCH) scheduling a physical downlink shared channel (PDSCH). The UE may transmit a physical uplink control channel (PUCCH) based on a PUCCH repetition factor, wherein the PUCCH repetition factor is indicated by a location of a control channel element (CCE) of the PDCCH, a PUCCH resource indicator (PRI) bitfield of the PDCCH, and at least one of: one or more parameters of the PDCCH, or one or more parameters of the PDSCH. Numerous other aspects are provided.

30 Claims, 8 Drawing Sheets

(51) Int. Cl.
  *H04W 72/54*    (2023.01)
  *H04L 1/00*     (2006.01)
  *H04L 1/1867*   (2023.01)
  *H04L 5/00*     (2006.01)
  *H04W 72/0446*  (2023.01)
  *H04W 72/0453*  (2023.01)

(52) U.S. Cl.
  CPC ....... *H04L 5/0051* (2013.01); *H04W 72/0446* (2013.01); *H04W 72/0453* (2013.01); *H04W 72/20* (2023.01); *H04W 72/54* (2023.01)

(58) Field of Classification Search
  CPC ......... H04W 72/1226; H04W 72/1205; H04W 72/12; H04W 72/14; H04W 72/0446; H04W 72/0453; H04W 72/0473; H04W 72/044; H04L 1/0003; H04L 1/0002; H04L 1/0004; H04L 1/0006; H04L 5/0051; H04L 5/005; H04L 5/0053
  See application file for complete search history.

(56)       References Cited

U.S. PATENT DOCUMENTS

| 2021/0234640 | A1* | 7/2021  | Cirik | H04L 1/1896  |
| 2021/0337568 | A1* | 10/2021 | Xu    | H04W 72/1289 |
| 2021/0360616 | A1* | 11/2021 | Yi    | H04W 72/0413 |
| 2022/0053522 | A1* | 2/2022  | MolavianJazi | H04W 72/0446 |
| 2022/0078781 | A1* | 3/2022  | Zhou  | H04L 5/0053  |
| 2022/0210679 | A1* | 6/2022  | Cirik | H04L 5/0053  |
| 2022/0295457 | A1* | 9/2022  | Jang  | H04W 72/0446 |
| 2022/0322314 | A1* | 10/2022 | Rastegardoost | H04L 1/1854 |
| 2022/0353711 | A1* | 11/2022 | Ying  | H04W 24/08   |

FOREIGN PATENT DOCUMENTS

WO  WO-2022086228 A1 *  4/2022
WO  WO-2022205236 A1 * 10/2022

OTHER PUBLICATIONS

Moderator (Qualcomm): "FL Summary #2 of PUCCH Coverage Enhancement", 3GPP TSG RAN WG1 #105-e, R1-2106154, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 24, 2021, XP052013560, 30 Pages, p. 1 to p. 7.

Qualcomm Incorporated: "PUCCH Enhancements", 3GPP Draft, 3GPP TSG-RAN WG1 Meeting #105-e, R1-2104688, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052010939, 9 Pages.

* cited by examiner

INDICATION OF CONTROL CHANNEL REPETITION FACTOR

FIELD OF THE DISCLOSURE

Aspects of the present disclosure generally relate to wireless communication and specifically, to techniques and apparatuses for indication of a control channel repetition factor.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UE) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may transmit uplink control information (such as hybrid automatic repeat request (HARD) feedback, scheduling requests, and similar communications) to a base station via a physical uplink control channel (PUCCH). A PUCCH repetition factor can be indicated for a UE, which indicates a number of times that the UE should repeat transmission of a PUCCH. The usage of a PUCCH repetition factor may improve robustness of the PUCCH, which can experience poor performance in certain situations, such as when the UE is located at a cell edge or when uplink transmit power is limited. A variety of PUCCH repetition factors may be useable in different scenarios.

SUMMARY

Some aspects described herein relate to a method of wireless communication performed by a user equipment (UE). The method may include receiving a physical downlink control channel (PDCCH) scheduling a physical downlink shared channel (PDSCH). The method may include transmitting a physical uplink control channel (PUCCH) based on a PUCCH repetition factor, wherein the PUCCH repetition factor is indicated by a location of a control channel element (CCE) of the PDCCH, a PUCCH resource indicator (PRI) bitfield of the PDCCH, and at least one of: one or more parameters of the PDCCH, or one or more parameters of the PDSCH.

Some aspects described herein relate to a method of wireless communication performed by a base station. The method may include transmitting a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH. The method may include receiving a plurality of repetitions of a PUCCH based on the PUCCH repetition factor.

Some aspects described herein relate to a UE for wireless communication. The UE may include at least one processor; and at least one memory communicatively coupled with the at least one processor and storing processor-readable code that, when executed by the at least one processor, is configured to cause the UE to receive a PDCCH scheduling a PDSCH. The processor-readable code, when executed by the at least one processor, may be configured to cause the UE to transmit a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH.

Some aspects described herein relate to a base station for wireless communication. The base station may include at least one processor; and at least one memory communicatively coupled with the at least one processor and storing processor-readable code that, when executed by the at least one processor, is configured to cause the base station to transmit a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH. The processor-readable code, when executed by the at least one processor, may be configured to cause the base station to receive a plurality of repetitions of a PUCCH based on the PUCCH repetition factor.

Some aspects described herein relate to a non-transitory computer-readable medium that stores a set of instructions for wireless communication by a UE. The set of instructions, when executed by one or more processors of the UE, may cause the UE to receive a PDCCH scheduling a PDSCH. The set of instructions, when executed by one or more processors of the UE, may cause the UE to transmit a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH.

Some aspects described herein relate to a non-transitory computer-readable medium that stores a set of instructions for wireless communication by a base station. The set of instructions, when executed by one or more processors of the base station, may cause the base station to transmit a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH. The set of instructions, when executed by one or more processors of the base station, may cause the base station to receive a plurality of repetitions of a PUCCH based on the PUCCH repetition factor.

Some aspects described herein relate to an apparatus for wireless communication. The apparatus may include means for receiving a PDCCH scheduling a PDSCH. The apparatus may include means for transmitting a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH.

Some aspects described herein relate to an apparatus for wireless communication. The apparatus may include means for transmitting a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH. The apparatus may include means for receiving a plurality of repetitions of a PUCCH based on the PUCCH repetition factor.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
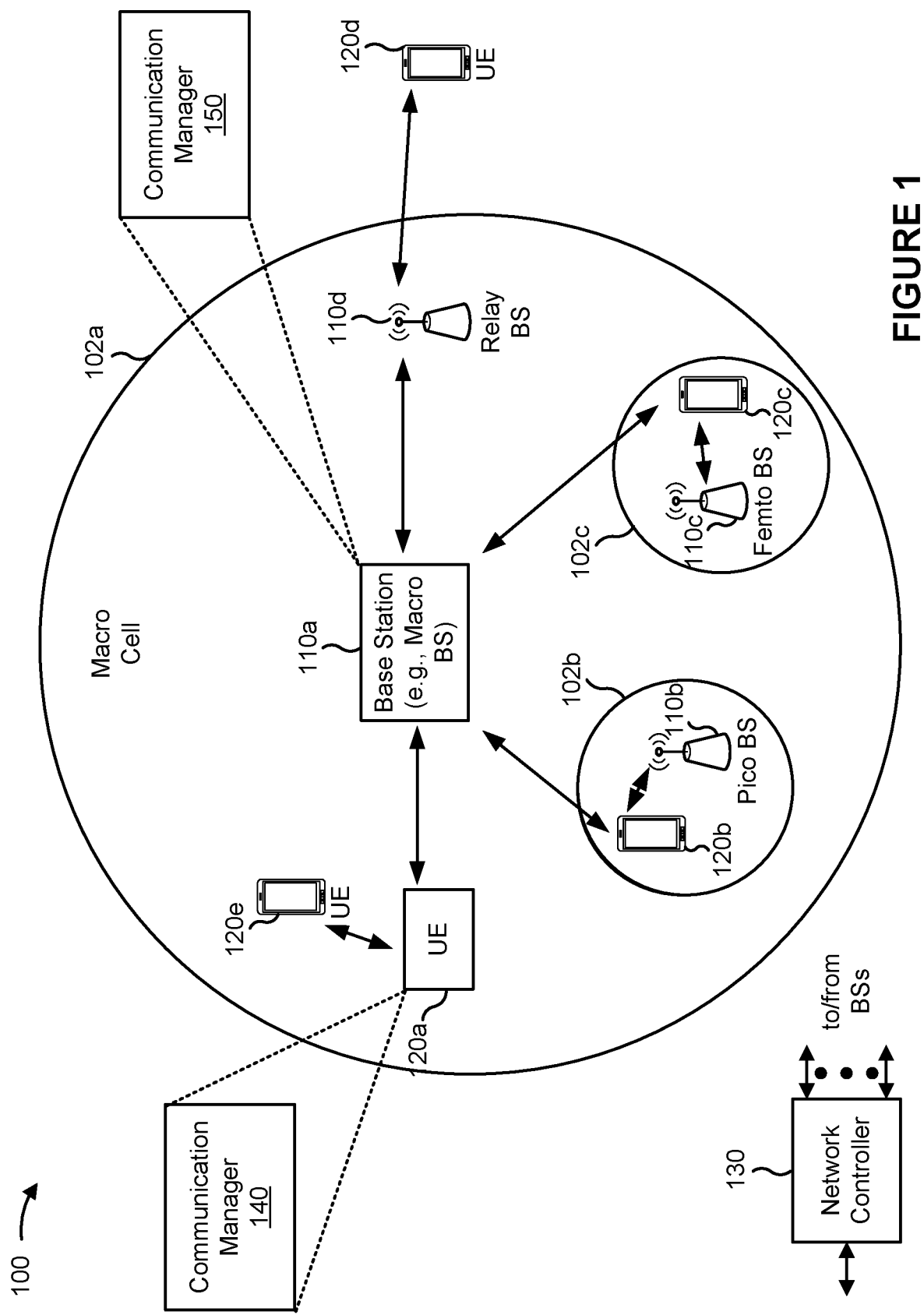
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to indication of a control channel repetition factor such as a PUCCH repetition factor. The control channel repetition factor may indicate a number of times that a control channel is to be transmitted. In some aspects, a base station may transmit, and a user equipment (UE) may receive, information dynamically indicating a PUCCH repetition factor that indicates a number of times that a PUCCH is to be transmitted across one or more uplink slots or sub-slots. In some aspects, a base station may transmit, and a UE may receive, a physical downlink control channel (PDCCH) scheduling a physical downlink shared channel (PDSCH) and a PUCCH repetition factor may be indicated by a location of a control channel element (CCE)

of the PDCCH, a PUCCH resource indicator (PRI) bitfield of the PDCCH, and one or more parameters of the PDCCH or the PDSCH. In some aspects, the PUCCH repetition factor may be indicated by the one or more parameters of the PDCCH or the PDSCH, and one of the location of the CCE or the PRI bitfield of the PDCCH.

Particular aspects of the subject matter described in this disclosure can be implemented to realize one or more of the following potential advantages. In some aspects, the described techniques may be used to provide a larger number of useable PUCCH repetition factors without increasing a size of the PRI bitfield or modifying a format of downlink control information (DCI). Furthermore, the described techniques can be used to indicate a combination of a PUCCH repetition factor and another parameter for PUCCH transmission without increasing the size of the PRI bitfield or modifying the format of DCI. Alternatively or additionally, in some aspects, the described techniques can be used to dynamically configure the UE with a larger PUCCH repetition factor to enable the UE to transmit the PUCCH with more energy and higher reliability over a larger number of uplink slots or sub-slots. In some other examples, the described techniques can be used to dynamically configure the UE with a smaller PUCCH repetition factor to reduce PUCCH latency.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may perform one or more operations associated with an indication of a control channel repetition factor. Additionally or alternatively, the communication manager 140 may perform one or more other operations described herein.

In some aspects, the base station 110 may include a communication manager 150. As described in more detail elsewhere herein, the communication manager 150 may perform one or more operations associated with an indication of a control channel repetition factor. Additionally or alternatively, the communication manager 150 may perform one or more other operations described herein.

Figure 2:
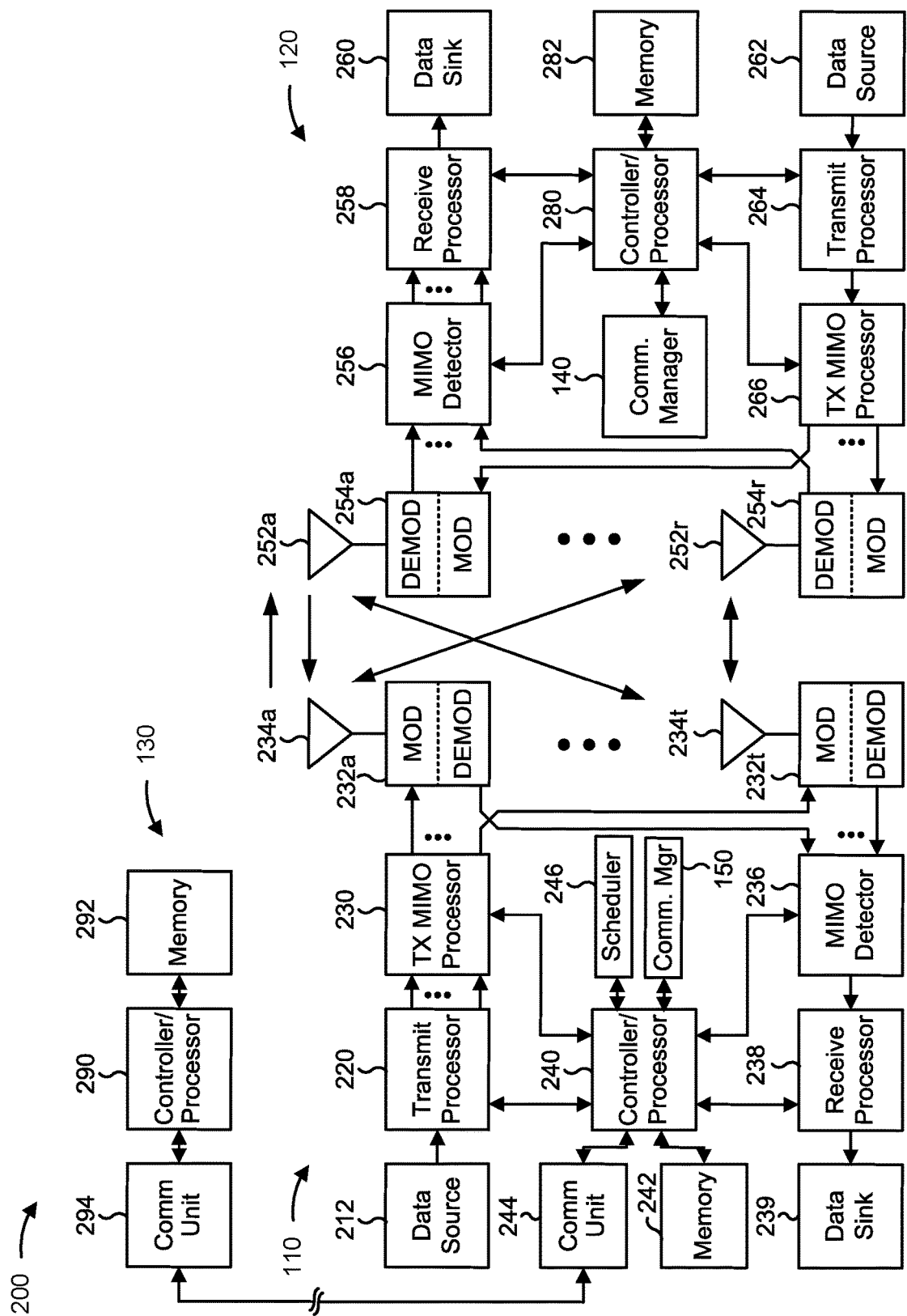
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with indication of a control channel repetition factor, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, UE 120 may include means for receiving a PDCCH scheduling a PDSCH, or means for transmitting a PUCCH based on a PUCCH repetition factor, wherein the PUCCH repetition factor is indicated by a location of a CCE of the PDCCH, a PRI bitfield of the PDCCH, and at least one of one or more parameters of the PDCCH or one or more parameters of the PDSCH, among other examples. In some aspects, such means may include one or more components of UE 120 described in connection with FIG. 2, such as controller/processor 280, transmit processor 264, TX MIMO processor 266, antenna 252, modem 254, MIMO detector 256, or receive processor 258, among other examples.

In some aspects, base station 110 may include means for transmitting a PDCCH scheduling a PDSCH and indicating a PUCCH repetition factor, wherein the PUCCH repetition factor is indicated by a location of a CCE of the PDCCH, a PRI bitfield of the PDCCH, and at least one of one or more parameters of the PDCCH or one or more parameters of the PDSCH or means for receiving a plurality of repetitions of a PUCCH based on the PUCCH repetition factor, among other examples. In some aspects, such means may include one or more components of base station 110 described in connection with FIG. 2, such as antenna 234, MIMO detector 236, receive processor 238, controller/processor 240, transmit processor 220, TX MIMO processor 230, modem 232, or antenna 234, among other examples.

Figure 3:
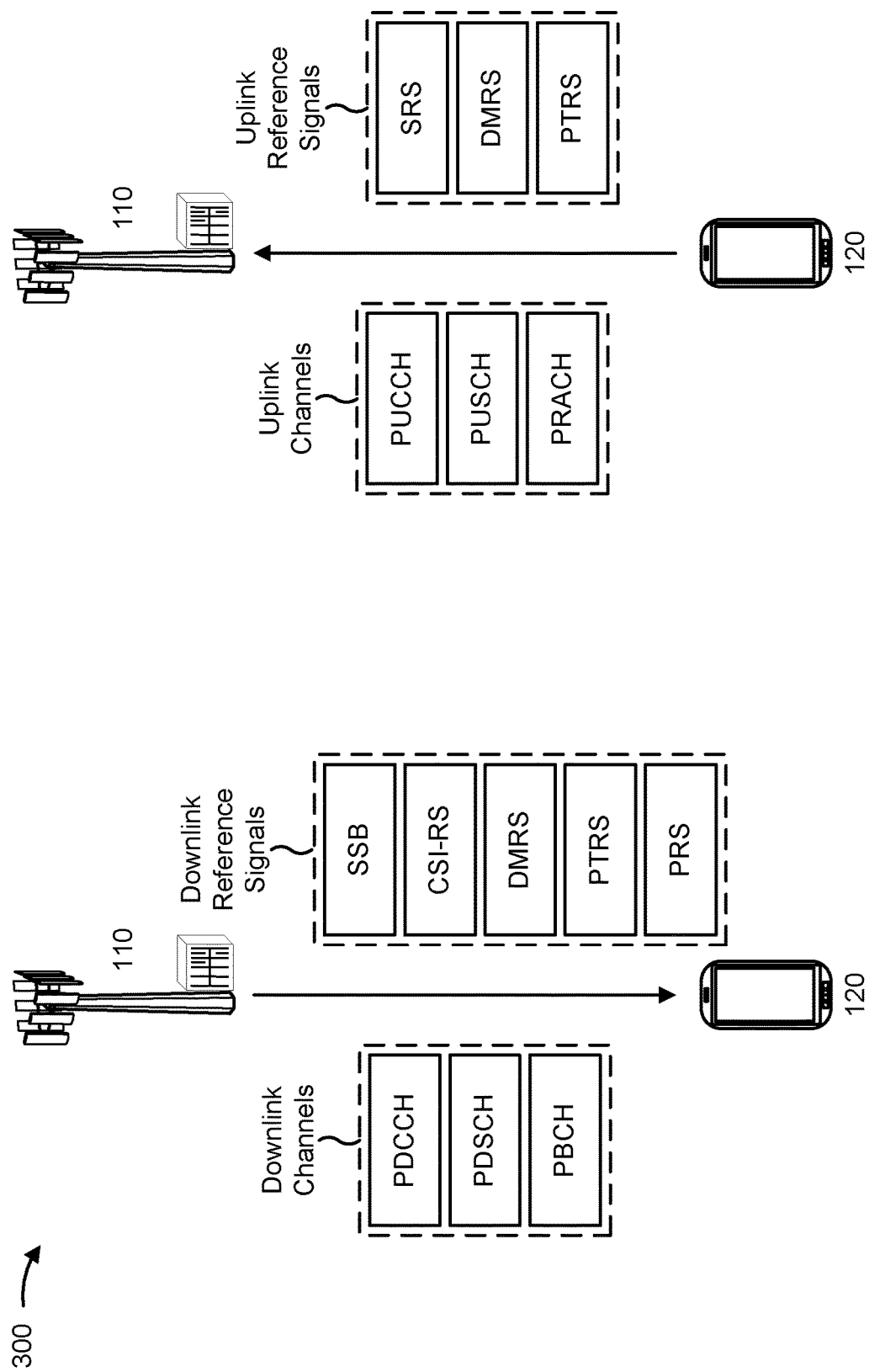
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a PDCCH that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit HARQ-ACK feedback that includes acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (for example, in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (for example, a rank), a precoding matrix (for example, a precoder), an MCS, or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, a PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve hearability by the UE 120, which may need to detect downlink signals from multiple neighboring base stations in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

The PUCCH may carry UCI, such as HARQ acknowledgments, scheduling requests, and channel state information (CSI) reports. A PUCCH may be transmitted on a PUCCH resource. A UE may identify a PUCCH resource using a combination of a PUCCH resource indicator (PRI) and an allocated control channel element (CCE). The PRI is a three-bit field from within the PDCCH DCI used to allocate a corresponding PDSCH. The combination of the three-bit PRI and a bit extracted from the allocated CCE of the PDCCH (based on whether the CCE has an even index or an odd index) is used to identify one out of 16 UE-specific PUCCH resources.

One or more PUCCH resources may be configured as part of a PUCCH resource set. A PUCCH resource set may be selected based at least in part on a size of the PUCCH to be transmitted. A PUCCH resource can be configured with a PUCCH repetition factor. Thus, the PUCCH repetition factor can be indicated by scheduling a PDSCH using a PDCCH that indicates a PUCCH resource configured with the desired PUCCH repetition factor. In this way, the combination of the three-bit PRI and the one bit indicated by the allocated CCE of the PDCCH can dynamically indicate a PUCCH repetition factor. However, the maximum number of PUCCH resources and PUCCH resource sets may limit the number of PUCCH repetition factors that can be indicated in this fashion. For example, if up to four PUCCH resource sets can be configured, and up to sixteen PUCCH resources can be configured, then there may be a limitation on how many different PUCCH repetition factors can be configured for each PUCCH resource set. The techniques described herein enable indication of a PUCCH repetition factor using one or more parameters associated with a PDCCH scheduling a PDSCH, or one or more factors associated with the PDSCH itself, which increases the number of usable PUCCH repetition factors without modifying DCI format or PRI bitfield length.

Figure 4:
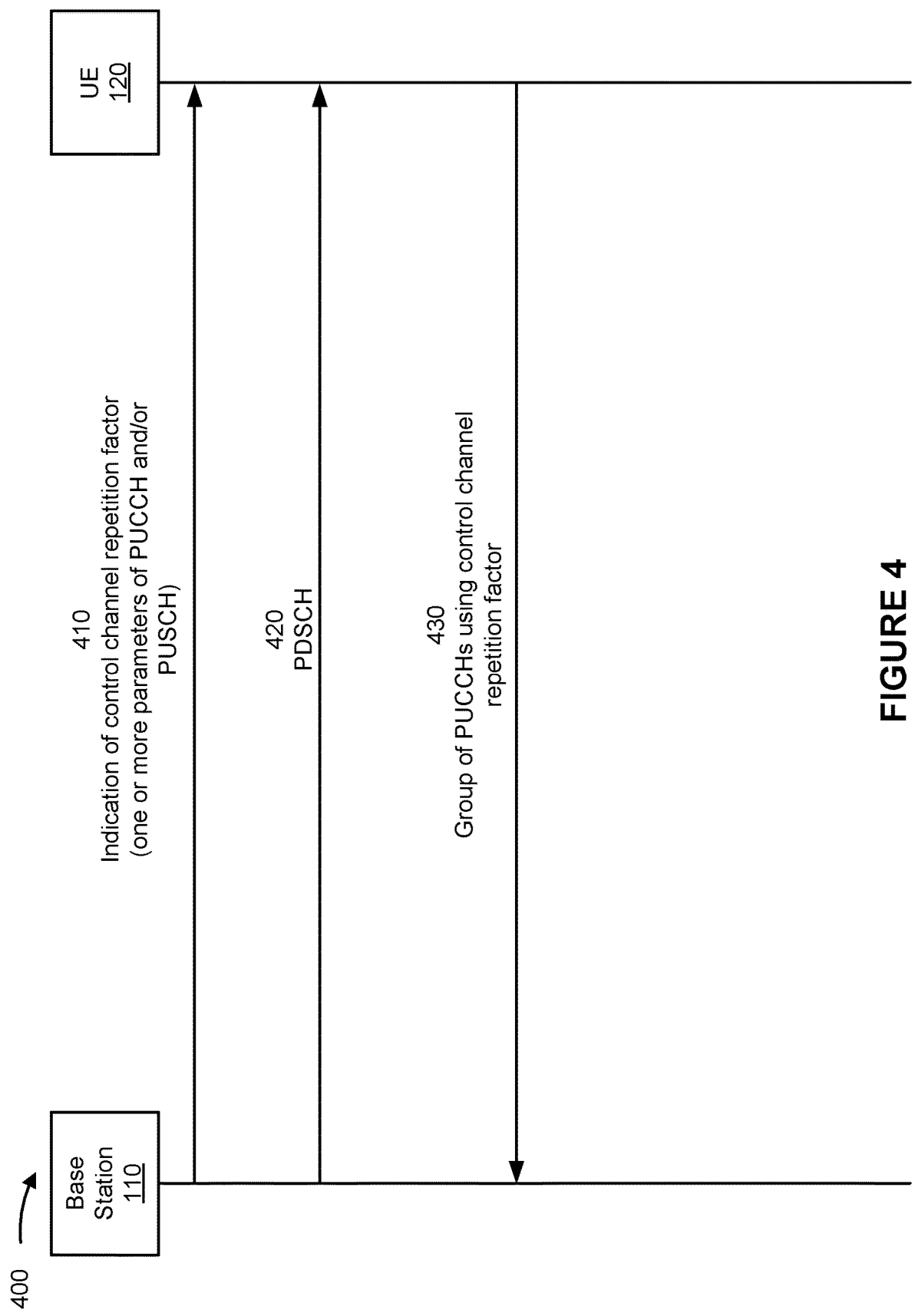
FIG. 4 is a diagram illustrating an example associated with an indication of a control channel repetition factor, in accordance with the present disclosure.
Figure 5:
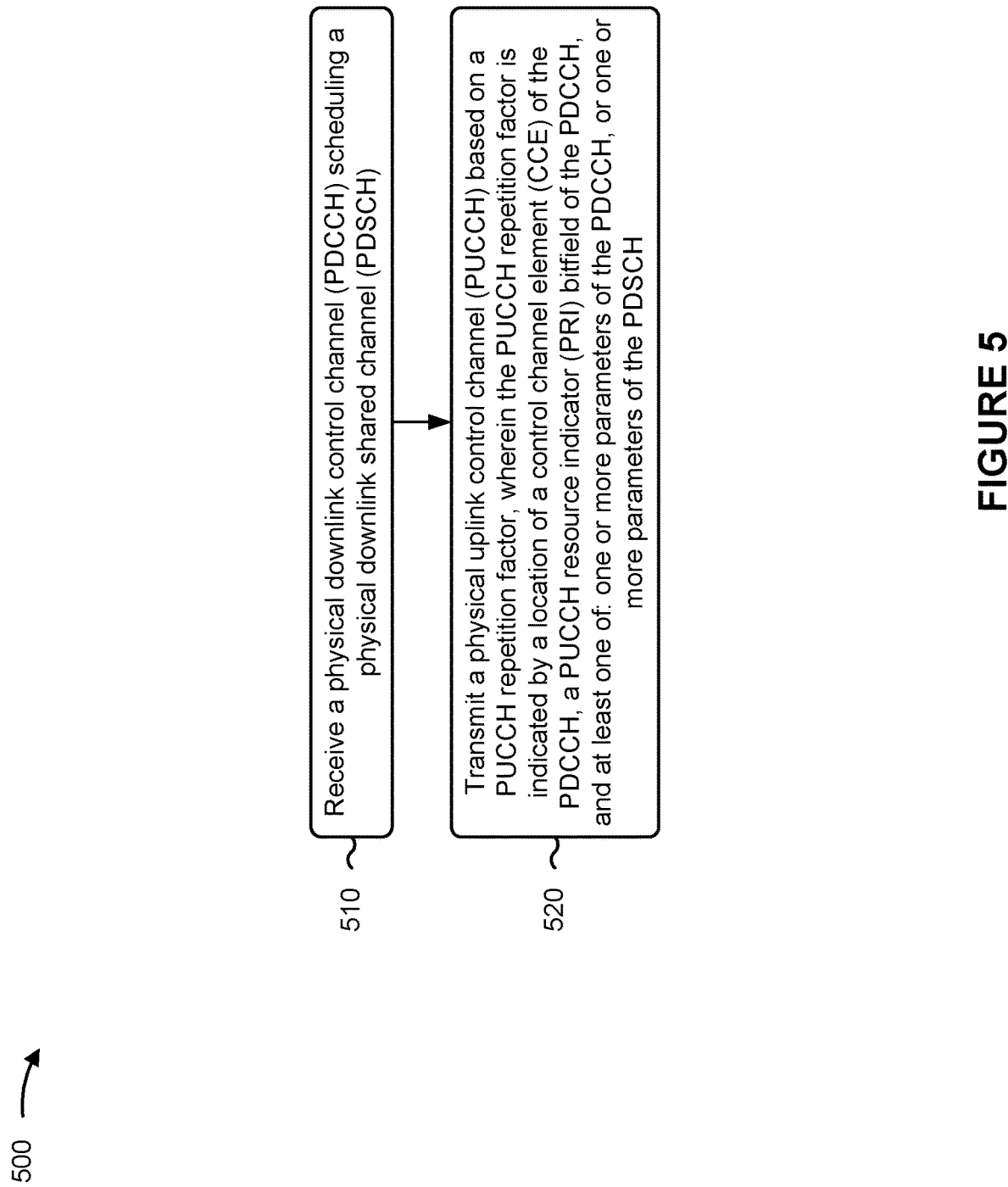
FIG. 5 is a flowchart illustrating an example process performed, for example, by a UE, that supports indicating a control channel repetition factor in accordance with the present disclosure.

FIG. 5 is a diagram illustrating an example 400 of indication of a control channel repetition factor, in accordance with the present disclosure. As shown in FIG. 4, a base station 110 and a UE 120 may communicate with one another. In some aspects, the base station 110 and the UE 120 may be included in a wireless network, such as wireless network 100. The base station 110 and the UE 120 may communicate via a wireless access link, which may include an uplink and a downlink.

In a first operation 410, the base station 110 may transmit, and the UE 120 may receive, an indication of a control channel repetition factor. For example, the base station 110 may transmit, and the UE 120 may receive, an indication of a PUCCH repetition factor.

In some aspects, the indication of the control channel repetition factor may be included in a semi-static configuration transmitted by the base station 110. For example, the indication may indicate that the control channel repetition factor is to be utilized until overridden by another configuration, for a preconfigured or predefined time period, or until expiration of a time period, among other examples.

In some aspects, the indication of the control channel repetition factor may be included in or indicated by a PDCCH received by the UE 120. In some aspects, the PDCCH includes DCI for scheduling resources for a PDSCH, and the control channel repetition factor may be indicated by a location of a CCE of the PDCCH, a PRI bitfield of the PDCCH, and one or more parameters of the PDCCH or one or more parameters of the PDSCH.

In some aspects, the one or more parameters of the PDCCH may include an aggregation level of the PDCCH. An aggregation level indicates how many resource elements the PDCCH occupies. In some aspects, the one or more parameters may include a cell radio network temporary identifier (C-RNTI) used to mask a cyclic redundancy check (CRC) of the PDCCH. For example, a specific C-RNTI may indicate a PUCCH repetition factor. As another example, a C-RNTI shifted by a fixed number may indicate an alternative subset of PUCCH resources associated with a PUCCH repetition factor. In some aspects, the one or more parameters may include one or more of a DMRS sequence of the PDCCH or a DMRS port of the PDCCH. The DMRS sequence and the DMRS port are used to generate a DMRS of the PDCCH.

In some aspects, the one or more parameters of the PDSCH may include a time resource of the PDSCH. For example, the PDCCH repetition factor may be indicated by whether a slot number of the PDSCH is even or odd. In some aspects, the one or more parameters of the PDSCH may include a frequency resource of the PDSCH. For example, the PDCCH repetition factor may be indicated based at least in part on whether a first resource block index of the PDSCH is even or odd. In some aspects, the one or more parameters of the PDSCH may include an MCS associated with the PDSCH. For example, the PDCCH repetition factor may be indicated based at least in part on comparing an MCS index of the MCS to a threshold, or based at least in part on a modulation order indicated by the MCS.

In some aspects, the indication of the control channel repetition factor may be based at least in part on a mapping. In some aspects, prior to transmitting a PDCCH carrying an ACK/NACK for semi-persistent scheduling (SPS) signaling, the base station 110 may transmit, and the UE 120 may receive, a SPS configuration. The SPS configuration may indicate a mapping between the PUCCH repetition factor and the location of the CCE, the PRI bitfield, and the one or more parameters of the PDCCH or the PDSCH. The UE 120 may determine the PUCCH repetition factor based at least in part on the mapping. In some aspects, the mapping between the PUCCH repetition factor and the location of the CCE, the PRI bitfield, and the one or more parameters of the PDCCH or the PDSCH is the same for the PUCCH carrying the ACK/NACK associated with SPS signaling as for a PUCCH carrying an ACK/NACK for the PDSCH.

In some aspects, the SPS configuration may indicate a mapping between the PUCCH repetition factor and the location of the CCE, the PRI bitfield, and the one or more parameters of the PDSCH. The UE 120 may determine the PUCCH repetition factor based at least in part on the mapping. In some aspects, the mapping between the PUCCH repetition factor and the location of the CCE, the PRI bitfield, and the one or more parameters of the PDSCH is the same for the PUCCH carrying the ACK/NACK associated with SPS signaling as for a PUCCH carrying an ACK/NACK for the PDSCH.

In some aspects, prior to transmitting the PDCCH, the base station 110 may transmit, and the UE 120 may receive, a CSI report setting. The CSI report setting may indicate a mapping between the PUCCH repetition factor and the location of the CCE, the PRI bitfield, and the one or more parameters of the PDCCH. In some aspects, the mapping may be between the PUCCH repetition factor and the location of the CCE, the PRI bitfield, and the one or more parameters of the PDSCH. The UE 120 may determine the PUCCH repetition factor based at least in part on the mapping.

In some aspects, a location of a CCE of the PDCCH, a PRI bitfield of the PDCCH, and one or more parameters of the PDCCH or one or more parameters of the PDSCH may indicate a PUCCH resource associated with the group of PUCCHs. The PUCCH resource may be associated with a PUCCH resource configuration that indicates the control channel repetition factor.

In some aspects, the control channel repetition factor may be preconfigured for the PUCCH resource. The UE 120 may determine the control channel repetition factor based at least in part on the control channel repetition factor being preconfigured for the PUCCH resource. In some other aspects, the control channel repetition factor may be configured per PUCCH resource. For example, the UE 120 may be allocated multiple PUCCH resources, and the control channel repetition factor may be preconfigured on a per PUCCH resource (or a group of PUCCH resources) basis.

In some aspects, the PUCCH resource may be indicated based at least in part on a C-RNTI that is used to mask a CRC of the PDCCH. In some aspects, the C-RNTI may be shifted by a fixed number to indicate an alternative subset of PUCCH resources. The UE 120 may determine the control channel repetition factor based at least in part on the control channel repetition factor being preconfigured for the alternative subset of PUCCH resources.

In some aspects, the control channel repetition factor may be indicated based at least in part on one or more parameters of the PDCCH and the PRI. In some aspects, the control channel repetition factor may be indicated based at least in part on one or more parameters of the PDCCH and content of the DCI that is different from the PRI. In some aspects, the control channel repetition factor may be indicated based at least in part on one or more parameters of the PDCCH, the PRI, and the content of the DCI that is different from the PRI. In some aspects, the control channel repetition factor may be indicated based at least in part on content of the DCI that is different from the PRI. In some aspects, the control channel repetition factor may be indicated based at least in part on the PRI and the content of the DCI that is different from the PRI.

In a second operation 420, the base station 110 may transmit, to the UE 120, one or more PDSCH transmissions scheduled by the DCI. Accordingly, in some aspects, the UE 120 may generate HARQ-ACK feedback for the PDSCH transmission(s) based at least in part on whether the UE 120 successfully receives or decodes the PDSCH transmission(s) scheduled by the DCI. For example, due to coverage issues, penetration loss, or beam blockage, among other examples, the PDSCH transmission(s) scheduled by the DCI may fail to reach the UE 120. Alternatively, in some cases, the UE 120 may receive the PDSCH transmission(s) scheduled by the DCI, but the UE 120 may be unable to successfully decode the PDSCH transmission(s). In either case, the HARQ-ACK feedback generated by the UE 120 may include a NACK to request that the base station 110 retransmit the PDSCH(s). Alternatively, in cases where the UE 120 receives and successfully decodes the PDSCH transmission(s) scheduled by the DCI, the HARQ-ACK feedback generated by the UE 120 may include an ACK to indicate that the base station 110 does not need to retransmit the PDSCH(s). Accordingly, in some aspects, the UE 120 may prepare a UCI payload that includes the HARQ-ACK feedback for the PDSCH transmission(s) scheduled by the DCI to be transmitted to the base station 110 via a group of one or more PUCCHs. The techniques described herein can also be applied for other forms of UCI, such as those scheduling requests or CSI reports.

In a third operation 430, the UE 120 may transmit, and the base station 110 may receive, the group of one or more PUCCHs based at least in part on the control channel repetition factor. For example, the UE 120 may identify the control channel repetition factor based at least in part on identifying a PUCCH resource associated with a PRI bitfield and a location of a first CCE of the PDCCH, and may identify the control channel repetition factor based at least in part on the PUCCH resource and the one or more parameters associated with the PDCCH or the PDSCH. In some aspects, the UE 120 may identify the PUCCH resource based at least in part on the one or more parameters associated with the PDCCH or the PDSCH. In some aspects, the UE 120 may select the control channel repetition factor from multiple possible sets of control channel repetition factors based at least in part on identifying an indicated set of control channel repetition factors using the one or more parameters associated with the PDCCH or the PDSCH.

In some aspects, the group of one or more PUCCHs may be associated with a scheduling request or may carry CSI, among other examples. In some aspects, the group of one or more PUCCHs may include HARQ-ACK feedback for the PDSCH transmission(s) scheduled by the DCI. For example, as described above, the indication of the control channel repetition factor may indicate the number of instances of a PUCCH that the UE 120 is to transmit for a PDSCH transmission(s) scheduled by the DCI included in the PDCCH.

FIG. 5 is a flowchart illustrating an example process 500 performed, for example, by a UE in accordance with the present disclosure. Example process 500 is an example where the UE (for example, UE 120) performs operations associated with indication of a control channel repetition factor.

As shown in FIG. 5, in some aspects, process 500 may include receiving a PDCCH scheduling a PDSCH (block 510). For example, the UE (such as by using communication manager 140 or reception component 702, depicted in FIG. 7) may receive a PDCCH scheduling a PDSCH, as described above.

As further shown in FIG. 5, in some aspects, process 500 may include transmitting a PUCCH using a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH (block 520). For example, the UE (such as by using communication manager 140 or transmission component 704, depicted in FIG. 7) may transmit a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH, as described above.

Process 500 may include additional aspects, such as any single aspect or any combination of aspects described below or in connection with one or more other processes described elsewhere herein.

In a first additional aspect, the PUCCH repetition factor is indicated by the location of the CCE of the PDCCH, the PRI bitfield of the PDCCH, and at least the one or more parameters of the PDCCH, and wherein the one or more parameters of the PDCCH include at least one of an aggregation level of the PDCCH, a cell radio network temporary identifier used to mask a cyclic redundancy check of the PDCCH, a DMRS sequence of the PDCCH, or a DMRS port of the PDCCH.

In a second additional aspect, alone or in combination with the first aspect, the PUCCH carries an acknowledgment or a negative acknowledgment for the PDSCH.

In a third additional aspect, alone or in combination with one or more of the first and second aspects, transmitting the PUCCH based on the PUCCH repetition factor further comprises transmitting PUCCHs, including the PUCCH, based on the PUCCH repetition factor until an indication of a different PUCCH repetition factor, associated with a different PUCCH, is received.

In a fourth additional aspect, alone or in combination with one or more of the first through third aspects, transmitting the PUCCH, based on the PUCCH repetition factor further comprises transmitting PUCCHs, including the PUCCH, based on the PUCCH repetition factor until an expiration time has elapsed.

In a fifth additional aspect, alone or in combination with one or more of the first through fourth aspects, the PUCCH carries an ACK or a NACK associated with SPS signaling.

In a sixth additional aspect, alone or in combination with one or more of the first through fifth aspects, process 500 includes receiving, prior to transmitting the PUCCH, an SPS configuration indicating a mapping between the PUCCH repetition factor, and the one or more parameters of the PDCCH, the location of the CCE, and the PRI bitfield.

In a seventh additional aspect, alone or in combination with one or more of the first through sixth aspects, a mapping between the PUCCH repetition factor, and the one or more parameters of the PDCCH, the location of the CCE, and the PRI bitfield, is the same for the PUCCH carrying the ACK/NACK associated with SPS signaling as for a PUCCH carrying an ACK/NACK for the PDSCH.

In an eighth additional aspect, alone or in combination with one or more of the first through seventh aspects, process 500 includes receiving, prior to transmitting the PUCCH, an SPS configuration indicating a mapping between the PUCCH repetition factor, and the one or more parameters of the PDSCH, the location of the CCE, and the PRI bitfield.

In a ninth additional aspect, alone or in combination with one or more of the first through eighth aspects, a mapping between the PUCCH repetition factor, and the one or more parameters of the PDSCH, the location of the CCE, and the PRI bitfield, is the same for the PUCCH carrying the ACK/NACK associated with SPS signaling as for a PUCCH carrying an ACK/NACK for the PDSCH.

In a tenth additional aspect, alone or in combination with one or more of the first through ninth aspects, the PUCCH is associated with a scheduling request.

In an eleventh additional aspect, alone or in combination with one or more of the first through tenth aspects, the PUCCH carries CSI.

In a twelfth additional aspect, alone or in combination with one or more of the first through eleventh aspects, process 500 includes receiving, prior to transmitting the PUCCH, a CSI report setting indicating a mapping between the PUCCH repetition factor, and the one or more parameters of the PDCCH, the location of the CCE, and the PRI bitfield.

In a thirteenth additional aspect, alone or in combination with one or more of the first through twelfth aspects, process 500 includes receiving, prior to transmitting the PUCCH, a CSI report setting indicating a mapping between the PUCCH repetition factor, and the one or more parameters of the PDSCH, the location of the CCE, and the PRI bitfield.

In a fourteenth additional aspect, alone or in combination with one or more of the first through thirteenth aspects, the one or more parameters of the PDSCH include at least one of a time resource of the PDSCH, a frequency resource of the PDSCH, or a modulation and coding scheme of the PDSCH.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
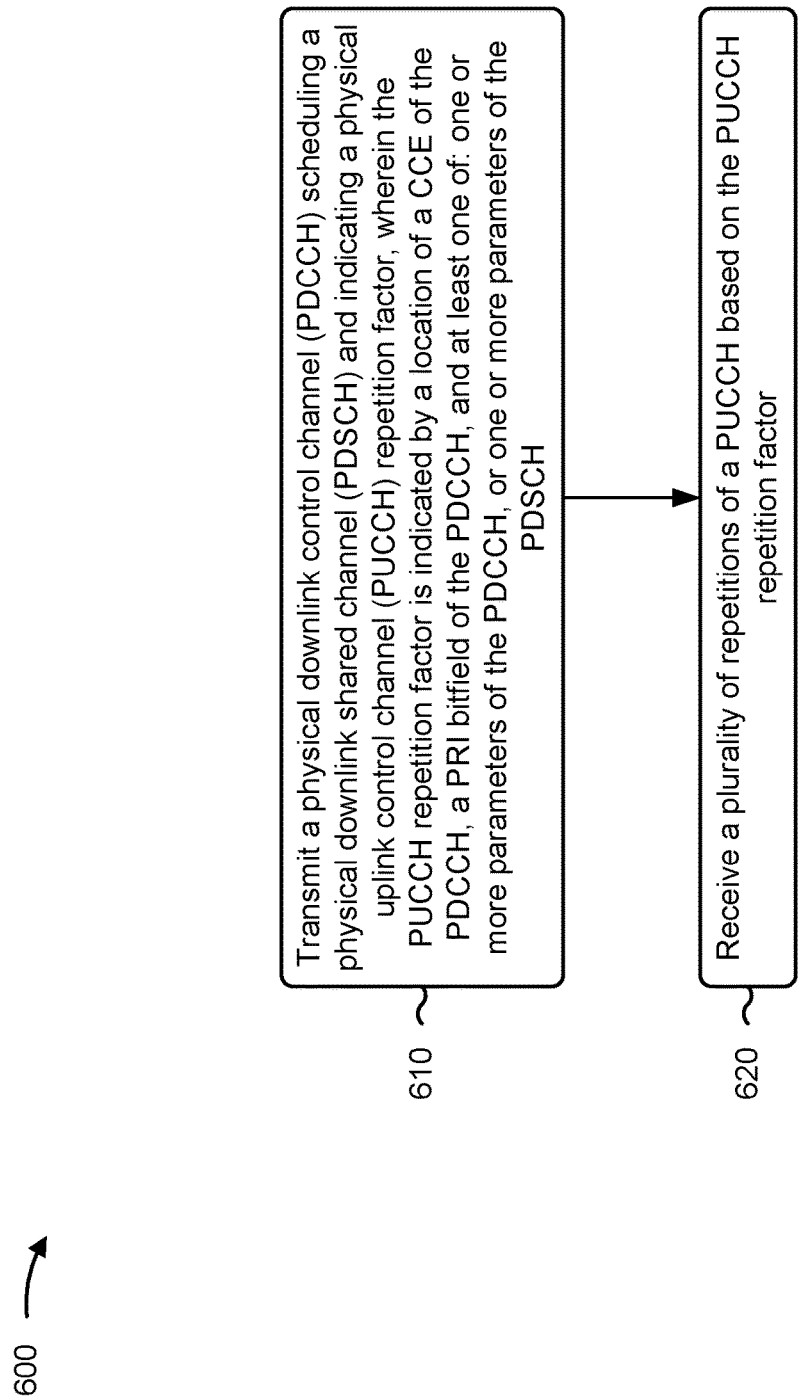
FIG. 6 is a flowchart illustrating an example process performed, for example, by a base station, that supports indicating a control channel repetition factor in accordance with the present disclosure.

FIG. 6 is a flowchart illustrating an example process 600 performed, for example, by a base station in accordance with the present disclosure. Example process 600 is an example where the base station (for example, base station 110) performs operations associated with indication of a control channel repetition factor.

As shown in FIG. 6, in some aspects, process 600 may include transmitting a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH (block 610). For example, the base station (such as by using communication manager 150 or transmission component 804, depicted in FIG. 8) may transmit a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH, as described above.

As further shown in FIG. 6, in some aspects, process 600 may include receiving a plurality of repetitions of a PUCCH based on the PUCCH repetition factor (block 620). For example, the base station (such as by using communication manager 150 or reception component 802, depicted in FIG. 8) may receive a plurality of repetitions of a PUCCH based on the PUCCH repetition factor, as described above.

Process 600 may include additional aspects, such as any single aspect or any combination of aspects described below or in connection with one or more other processes described elsewhere herein.

In a first additional aspect, the at least one of the one or more parameters of the PDCCH or the one or more parameters of the PDSCH comprises the one or more parameters of the PDCCH, and wherein the one or more parameters of the PDCCH include at least one of an aggregation level of the PDCCH, a cell radio network temporary identifier used to mask a cyclic redundancy check of the PDCCH, a DMRS sequence of the PDCCH, or a DMRS port of the PDCCH.

In a second additional aspect, alone or in combination with the first aspect, the PUCCH carries an acknowledgment or a negative acknowledgment for the PDSCH.

In a third additional aspect, alone or in combination with one or more of the first and second aspects, receiving the plurality of repetitions of the PUCCH based on the PUCCH repetition factor further comprises receiving the plurality of repetitions of the PUCCH based on the PUCCH repetition factor until an indication of a different PUCCH repetition factor, associated with a different PUCCH, is received.

In a fourth additional aspect, alone or in combination with one or more of the first through third aspects, receiving the plurality of repetitions of the PUCCH based on the PUCCH repetition factor further comprises receiving repetitions of a group of PDCCHs, including the plurality of repetitions of the PUCCH, based on the PUCCH repetition factor until an expiration time has elapsed.

In a fifth additional aspect, alone or in combination with one or more of the first through fourth aspects, the PUCCH carries an ACK or a NACK associated with SPS signaling.

In a sixth additional aspect, alone or in combination with one or more of the first through fifth aspects, process 600 includes transmitting, prior to receiving the plurality of repetitions of the PUCCH, an SPS configuration indicating a mapping between the PUCCH repetition factor, and the one or more parameters of the PDCCH, the location of the CCE, and the PRI bitfield.

In a seventh additional aspect, alone or in combination with one or more of the first through sixth aspects, a mapping between the PUCCH repetition factor, and the one or more parameters of the PDCCH, the location of the CCE, and the PRI bitfield, is the same for the PUCCH carrying the ACK/NACK associated with SPS signaling as for a PUCCH carrying an ACK/NACK for the PDSCH.

In an eighth additional aspect, alone or in combination with one or more of the first through seventh aspects, process 600 includes transmitting, prior to receiving the plurality of repetitions of the PUCCH, an SPS configuration indicating a mapping between the PUCCH repetition factor, and the one or more parameters of the PDSCH, the location of the CCE, and the PRI bitfield.

In a ninth additional aspect, alone or in combination with one or more of the first through eighth aspects, the PUCCH is associated with a scheduling request.

In a tenth additional aspect, alone or in combination with one or more of the first through ninth aspects, the PUCCH carries CSI.

In an eleventh additional aspect, alone or in combination with one or more of the first through tenth aspects, process 600 includes transmitting, prior to receiving the plurality of repetitions of the PUCCH, a CSI report setting indicating a mapping between the PUCCH repetition factor, and the one or more parameters of the PDCCH, the location of the CCE, and the PRI bitfield.

In a twelfth additional aspect, alone or in combination with one or more of the first through eleventh aspects, process 600 includes transmitting, prior to receiving the plurality of repetitions of the PUCCH, a CSI report setting indicating a mapping between the PUCCH repetition factor, and the one or more parameters of the PDSCH, the location of the CCE, and the PRI bitfield.

In a thirteenth additional aspect, alone or in combination with one or more of the first through twelfth aspects, the one or more parameters of the PDSCH include at least one of a time resource of the PDSCH, a frequency resource of the PDSCH, or a modulation and coding scheme of the PDSCH.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
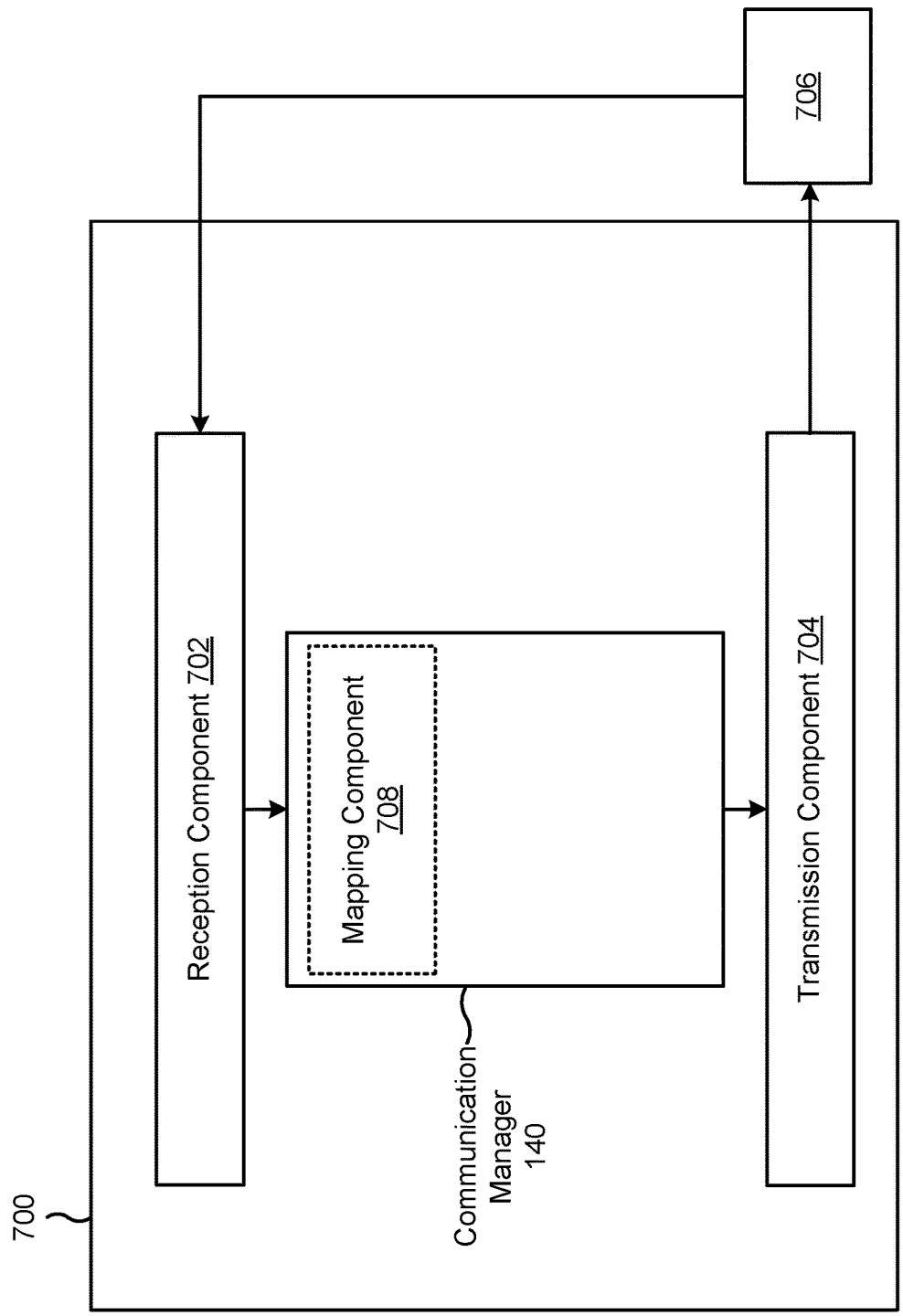
FIGS. 7 and 8 are diagrams of example apparatuses for wireless communication, that support indicating a control channel repetition factor in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 4. Additionally or alternatively, the apparatus 700 may be configured to perform one or more processes described herein, such as process 500 of FIG. 5. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may receive or may cause the reception component 702 to receive a PDCCH scheduling a PDSCH. The communication manager 140 may transmit or may cause the transmission component 704 to transmit a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a mapping component 708, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive a PDCCH scheduling a PDSCH. The transmission component 704 may transmit a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH.

The reception component 702 may receive, prior to transmitting the PUCCH, an SPS configuration indicating a mapping between the PUCCH repetition factor, and the one or more parameters of the PDCCH, the location of the CCE, and the PRI bitfield. The mapping component 708 may determine the PUCCH repetition factor based at least in part on the mapping.

The reception component 702 may receive, prior to transmitting the PUCCH, an SPS configuration indicating a mapping between the PUCCH repetition factor, and the one or more parameters of the PDSCH, the location of the CCE, and the PRI bitfield. The mapping component 708 may determine the PUCCH repetition factor based at least in part on the mapping.

The reception component 702 may receive, prior to transmitting the PUCCH, a CSI report setting indicating a mapping between the PUCCH repetition factor, and the one or more parameters of the PDCCH, the location of the CCE, and the PRI bitfield. The mapping component 708 may determine the PUCCH repetition factor based at least in part on the mapping.

The reception component 702 may receive, prior to transmitting the PUCCH, a CSI report setting indicating a mapping between the PUCCH repetition factor, and the one or more parameters of the PDSCH, the location of the CCE, and the PRI bitfield. The mapping component 708 may determine the PUCCH repetition factor based at least in part on the mapping.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
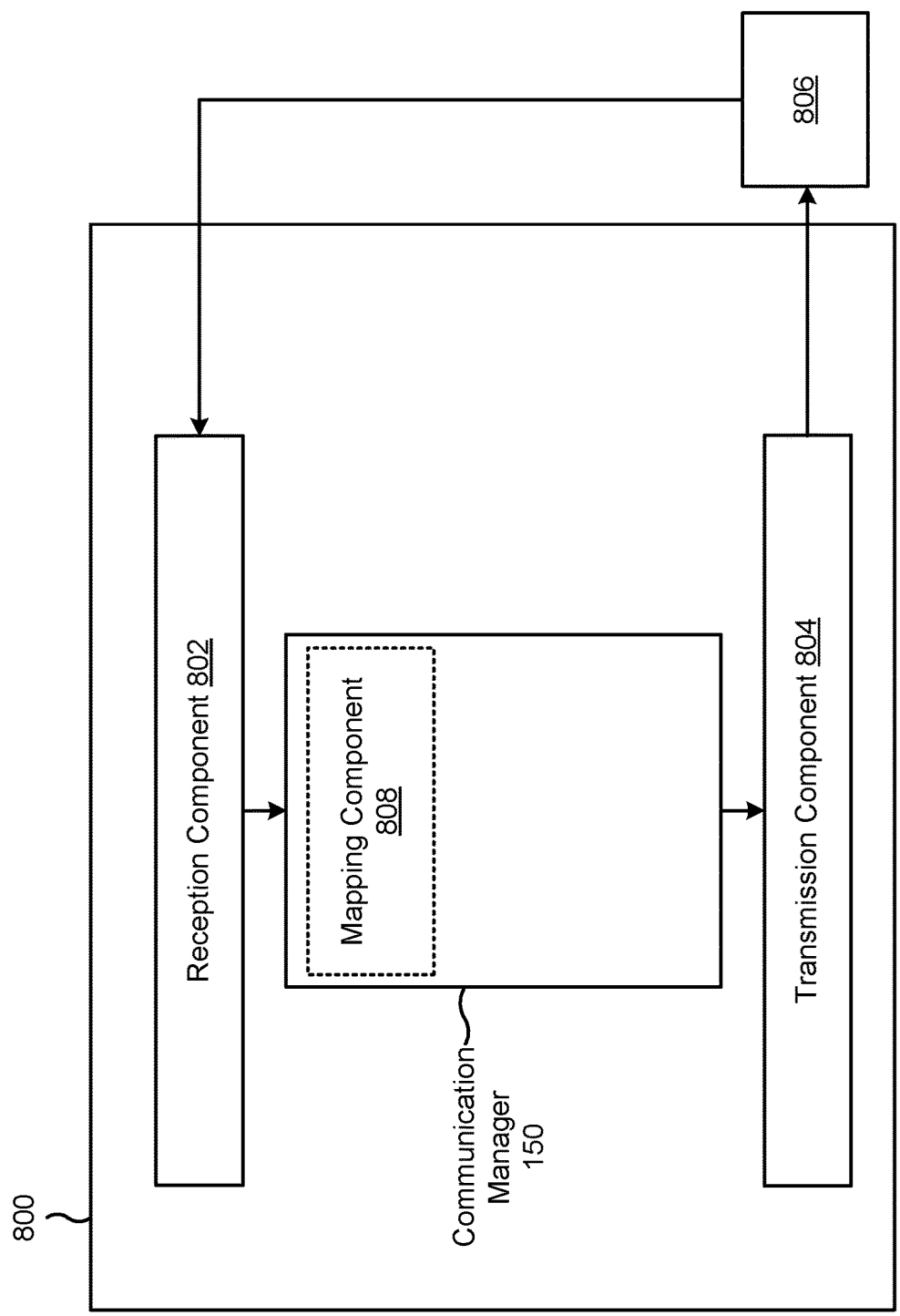

FIG. 8 is a diagram of an example apparatus 800 for wireless communication in accordance with the present disclosure. The apparatus 800 may be a base station, or a base station may include the apparatus 800. In some aspects, the apparatus 800 includes a reception component 802, a transmission component 804, and a communication manager 150, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 may include one or more components of the base station described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 150. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, the communication manager 150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The communication manager 150 may transmit or may cause the transmission component 804 to transmit a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH or one or more parameters of the PDSCH. The communication manager 150 may receive or may cause the reception component 802 to receive a plurality of repetitions of a PUCCH based on the PUCCH repetition factor. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a mapping component 808. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 may transmit a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH or one or more parameters of the PDSCH. The reception component 802 may receive a plurality of repetitions of a PUCCH based on the PUCCH repetition factor.

The mapping component 808 may generate a mapping between: the PUCCH repetition factor, and the one or more parameters of the PDCCH, the location of the CCE, and the PRI bitfield. The transmission component 804 may transmit, prior to receiving the plurality of repetitions of the PUCCH, an SPS configuration indicating the mapping between: the PUCCH repetition factor, and the one or more parameters of the PDCCH, the location of the CCE, and the PRI bitfield.

The mapping component 808 may generate a mapping between: the PUCCH repetition factor, and the one or more parameters of the PDSCH, the location of the CCE, and the PRI bitfield. The transmission component 804 may transmit, prior to receiving the plurality of repetitions of the PUCCH, an SPS configuration indicating the mapping between: the PUCCH repetition factor, and the one or more parameters of the PDSCH, the location of the CCE, and the PRI bitfield.

The transmission component 804 may transmit, prior to receiving the plurality of repetitions of the PUCCH, a CSI report setting indicating the mapping between: the PUCCH repetition factor, and the one or more parameters of the PDCCH, the location of the CCE, and the PRI bitfield.

The transmission component 804 may transmit, prior to receiving the PUCCH, a CSI report setting indicating the mapping between: the PUCCH repetition factor, and the one or more parameters of the PDSCH, the location of the CCE, and the PRI bitfield.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving a PDCCH scheduling a PDSCH; and transmitting a PUCCH based on a PUCCH repetition factor, wherein the PUCCH repetition factor is indicated by a location of a CCE of the PDCCH, a PRI bitfield of the PDCCH, and at least one of: one or more parameters of the PDCCH, or one or more parameters of the PDSCH.

Aspect 2: The method of Aspect 1, wherein the PUCCH repetition factor is indicated by the location of the CCE of the PDCCH, the PRI bitfield of the PDCCH, and at least the one or more parameters of the PDCCH, and wherein the one or more parameters of the PDCCH include at least one of: an aggregation level of the PDCCH, a cell radio network temporary identifier used to mask a cyclic redundancy check of the PDCCH, a DMRS sequence of the PDCCH, or a DMRS port of the PDCCH.

Aspect 3: The method of one or more of Aspects 1 and 2, wherein the PUCCH carries an acknowledgment or a negative acknowledgment for the PDSCH.

Aspect 4: The method of one or more of Aspects 1 through 3, wherein transmitting the PUCCH based on the PUCCH repetition factor further comprises transmitting the PUCCH based on the PUCCH repetition factor until an indication of a different PUCCH repetition factor, associated with a different PUCCH, is received.

Aspect 5: The method of one or more of Aspects 1 through 4, wherein transmitting the PUCCH based on the PUCCH repetition factor further comprises transmitting PUCCHs, including the PUCCH, based on the PUCCH repetition factor until an expiration time has elapsed.

Aspect 6: The method of one or more of Aspects 1 through 5, wherein the PUCCH carries an acknowledgment or a negative acknowledgment (ACK/NACK) associated with SPS signaling.

Aspect 7: The method of Aspect 6, further comprising: receiving, prior to transmitting the PUCCH, an SPS configuration indicating a mapping between: the PUCCH repetition factor, and the one or more parameters of the PDCCH, the location of the CCE, and the PRI bitfield.

Aspect 8: The method of Aspect 6, wherein a mapping between: the PUCCH repetition factor, and the one or more parameters of the PDCCH, the location of the CCE, and the PRI bitfield, is the same for the PUCCH carrying the ACK/NACK associated with SPS signaling as for a PUCCH carrying an ACK/NACK for the PDSCH.

Aspect 9: The method of Aspect 6, further comprising: receiving, prior to transmitting the PUCCH, an SPS configuration indicating a mapping between: the PUCCH repetition factor, and the one or more parameters of the PDSCH, the location of the CCE, and the PRI bitfield.

Aspect 10: The method of Aspect 6, wherein a mapping between: the PUCCH repetition factor, and the one or more parameters of the PDSCH, the location of the CCE, and the PRI bitfield, is the same for the PUCCH carrying the ACK/NACK associated with SPS signaling as for a PUCCH carrying an ACK/NACK for the PDSCH.

Aspect 11: The method of one or more of Aspects 1 through 10, wherein the PUCCH is associated with a scheduling request.

Aspect 12: The method of one or more of Aspects 1 through 11, wherein the PUCCH carries CSI.

Aspect 13: The method of Aspect 12, further comprising: receiving, prior to transmitting the PUCCH, a CSI report setting indicating a mapping between: the PUCCH repetition factor, and the one or more parameters of the PDCCH, the location of the CCE, and the PRI bitfield.

Aspect 14: The method of Aspect 12, further comprising: receiving, prior to transmitting the PUCCH, a CSI report setting indicating a mapping between: the PUCCH repetition factor, and the one or more parameters of the PDSCH, the location of the CCE, and the PRI bitfield.

Aspect 15: The method of one or more of Aspects 1 through 14, wherein the one or more parameters of the PDSCH include at least one of: a time resource of the PDSCH, a frequency resource of the PDSCH, or a modulation and coding scheme of the PDSCH.

Aspect 16: A method of wireless communication performed by a base station, comprising: transmitting a PDCCH scheduling a PDSCH and indicating a PUCCH repetition factor, wherein the PUCCH repetition factor is indicated by a location of a CCE of the PDCCH, a PRI bitfield of the PDCCH, and at least one of: one or more parameters of the PDCCH or one or more parameters of the PDSCH; and receiving a plurality of repetitions of a PUCCH based on the PUCCH repetition factor.

Aspect 17: The method of Aspect 16, wherein the at least one of: the one or more parameters of the PDCCH or the one or more parameters of the PDSCH comprises the one or more parameters of the PDCCH, and wherein the one or more parameters of the PDCCH include at least one of: an aggregation level of the PDCCH, a cell radio network temporary identifier used to mask a cyclic redundancy check of the PDCCH, a DMRS sequence of the PDCCH, or a DMRS port of the PDCCH.

Aspect 18: The method of one or more of Aspects 16 and 17, wherein the PUCCH carries an acknowledgment or a negative acknowledgment for the PDSCH.

Aspect 19: The method of one or more of Aspects 16 through 18, wherein receiving the plurality of repetitions of the PUCCH based on the PUCCH repetition factor further comprises receiving the plurality of repetitions of the PUCCH based on the PUCCH repetition factor until an indication of a different PUCCH repetition factor, associated with a different PUCCH, is received.

Aspect 20: The method of one or more of Aspects 16 through 19, wherein receiving the plurality of repetitions of the PUCCH based on the PUCCH repetition factor further comprises receiving repetitions of a group of PUCCHs, including the plurality of repetitions of the PUCCH, based on the PUCCH repetition factor until an expiration time has elapsed.

Aspect 21: The method of one or more of Aspects 16 through 20, wherein the PUCCH carries an acknowledgment or a negative acknowledgment (ACK/NACK) associated with SPS signaling.

Aspect 22: The method of Aspect 21, further comprising: transmitting, prior to receiving the plurality of repetitions of the PUCCH, an SPS configuration indicating a mapping between: the PUCCH repetition factor, and the one or more parameters of the PDCCH, the location of the CCE, and the PRI bitfield.

Aspect 23: The method of Aspect 21, wherein a mapping between: the PUCCH repetition factor, and the one or more parameters of the PDCCH, the location of the CCE, and the PRI bitfield, is the same for the PUCCH carrying the ACK/NACK associated with SPS signaling as for a PUCCH carrying an ACK/NACK for the PDSCH.

Aspect 24: The method of Aspect 21, further comprising: transmitting, prior to receiving the plurality of repetitions of the PUCCH, an SPS configuration indicating a mapping between: the PUCCH repetition factor, and the one or more parameters of the PDSCH, the location of the CCE, and the PRI bitfield.

Aspect 25: The method of Aspect 21, wherein a mapping between: the PUCCH repetition factor, and the one or more parameters of the PDSCH, the location of the CCE, and the PRI bitfield, is the same for the PUCCH carrying the ACK/NACK associated with SPS signaling as for a PUCCH carrying an ACK/NACK for the PDSCH.

Aspect 26: The method of one or more of Aspects 16 through 25, wherein the PUCCH is associated with a scheduling request.

Aspect 27: The method of one or more of Aspects 16 through 26, wherein the PUCCH carries CSI.

Aspect 28: The method of Aspect 27, further comprising: transmitting, prior to receiving the plurality of repetitions of the PUCCH, a CSI report setting indicating a mapping between: the PUCCH repetition factor, and the one or more parameters of the PDCCH, the location of the CCE, and the PRI bitfield.

Aspect 29: The method of Aspect 27, further comprising: transmitting, prior to receiving the plurality of repetitions of the PUCCH, a CSI report setting indicating a mapping between: the PUCCH repetition factor, and the one or more parameters of the PDSCH, the location of the CCE, and the PRI bitfield.

Aspect 30: The method of one or more of Aspects 16 through 29, wherein the one or more parameters of the PDSCH include at least one of: a time resource of the PDSCH, a frequency resource of the PDSCH, or a modulation and coding scheme of the PDSCH.

Aspect 31: An apparatus for wireless communication at a device, comprising a processor; memory coupled with the processor; and instructions stored in the memory and executable by the processor to cause the apparatus to perform the method of one or more of Aspects 1 through 15.

Aspect 32: A device for wireless communication, comprising a memory and one or more processors coupled to the memory, the one or more processors configured to perform the method of one or more of Aspects 1 through 15.

Aspect 33: An apparatus for wireless communication, comprising at least one means for performing the method of one or more of Aspects 1 through 15.

Aspect 34: A non-transitory computer-readable medium storing code for wireless communication, the code comprising instructions executable by a processor to perform the method of one or more of Aspects 1 through 15.

Aspect 35: A non-transitory computer-readable medium storing a set of instructions for wireless communication, the set of instructions comprising one or more instructions that, when executed by one or more processors of a device, cause the device to perform the method of one or more of Aspects 1 through 15.

Aspect 36: An apparatus for wireless communication at a device, comprising a processor; memory coupled with the processor; and instructions stored in the memory and executable by the processor to cause the apparatus to perform the method of one or more of Aspects 16 through 30.

Aspect 37: A device for wireless communication, comprising a memory and one or more processors coupled to the memory, the one or more processors configured to perform the method of one or more of Aspects 16 through 30.

Aspect 38: An apparatus for wireless communication, comprising at least one means for performing the method of one or more of Aspects 16 through 30.

Aspect 39: A non-transitory computer-readable medium storing code for wireless communication, the code comprising instructions executable by a processor to perform the method of one or more of Aspects 16 through 30.

Aspect 40: A non-transitory computer-readable medium storing a set of instructions for wireless communication, the set of instructions comprising one or more instructions that, when executed by one or more processors of a device, cause the device to perform the method of one or more of Aspects 16 through 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one processor; and
   at least one memory communicatively coupled with the at least one processor and storing processor-readable code that, when executed by the at least one processor, is configured to cause the UE to:
      receive a physical downlink control channel (PDCCH) scheduling a physical downlink shared channel (PDSCH); and
      transmit a physical uplink control channel (PUCCH) based on a PUCCH repetition factor, wherein the PUCCH repetition factor is indicated by a combination of a location of a control channel element (CCE) of the PDCCH, a PUCCH resource indicator (PRI) bitfield of the PDCCH, and at least one of: one or more parameters of the PDCCH, or one or more parameters of the PDSCH, wherein the PUCCH repetition factor indicates a number of times that the PUCCH is to be transmitted.

2. The UE of claim 1, wherein the PUCCH repetition factor is indicated by the combination of the location of the CCE of the PDCCH, the PRI bitfield of the PDCCH, and at least the one or more parameters of the PDCCH, and wherein the one or more parameters of the PDCCH include at least one of:
   an aggregation level of the PDCCH,
   a cell radio network temporary identifier used to mask a cyclic redundancy check of the PDCCH,
   a demodulation reference signal (DMRS) sequence of the PDCCH, or
   a DMRS port of the PDCCH.

3. The UE of claim 1, wherein the PUCCH carries an acknowledgment or a negative acknowledgment for the PDSCH.

4. The UE of claim 1, wherein, to cause the UE to transmit the PUCCH based on the PUCCH repetition factor, the processor-readable code, when executed by the at least one processor, is configured to cause the UE to transmit PUCCHs, including the PUCCH, based at least in part on the PUCCH repetition factor until an indication of a different PUCCH repetition factor, associated with the PUCCHs, is received.

5. The UE of claim 1, wherein, to cause the UE to transmit the PUCCH based at least in part on the PUCCH repetition factor, the processor-readable code, when executed by the at least one processor, is configured to cause the UE to transmit PUCCHs, including the PUCCH, based on the PUCCH repetition factor until an expiration time has elapsed.

6. The UE of claim 1, wherein the PUCCH carries an acknowledgment or a negative acknowledgment (ACK/NACK) associated with semi-persistent scheduling (SPS) signaling.

7. The UE of claim 6, wherein the at least one memory further stores processor-readable code that, when executed by the at least one processor, is configured to cause the UE to:
   receive, prior to transmitting the PUCCH, an SPS configuration indicating a mapping between:
      the PUCCH repetition factor, and
      the one or more parameters of the PDCCH, the location of the CCE, and the PRI bitfield.

8. The UE of claim 6, wherein a mapping between:
   the PUCCH repetition factor, and
   the one or more parameters of the PDCCH, the location of the CCE, and the PRI bitfield, is the same for the PUCCH carrying the ACK/NACK associated with SPS signaling as for a PUCCH carrying an ACK/NACK for the PDSCH.

9. The UE of claim 6, wherein the at least one memory further stores processor-readable code that, when executed by the at least one processor, is configured to cause the UE to:
receive, prior to transmitting the PUCCH, an SPS configuration indicating a mapping between:
the PUCCH repetition factor, and
the one or more parameters of the PDSCH, the location of the CCE, and the PRI bitfield.

10. The UE of claim 6, wherein a mapping between:
the PUCCH repetition factor, and
the one or more parameters of the PDSCH, the location of the CCE, and the PRI bitfield,
is the same for the PUCCH carrying the ACK/NACK associated with SPS signaling as for a PUCCH carrying an ACK/NACK for the PDSCH.

11. The UE of claim 1, wherein the PUCCH carries channel state information (CSI).

12. The UE of claim 11, wherein the at least one memory further stores processor-readable code that, when executed by the at least one processor, is configured to cause the UE to:
receive, prior to transmitting the PUCCH, a CSI report setting indicating a mapping between:
the PUCCH repetition factor, and
the one or more parameters of the PDCCH, the location of the CCE, and the PRI bitfield.

13. The UE of claim 11, wherein the at least one memory further stores processor-readable code that, when executed by the at least one processor, is configured to cause the UE to:
receive, prior to transmitting the PUCCH, a CSI report setting indicating a mapping between:
the PUCCH repetition factor, and
the one or more parameters of the PDSCH, the location of the CCE, and the PRI bitfield.

14. The UE of claim 1, wherein the one or more parameters of the PDSCH include at least one of:
a time resource of the PDSCH,
a frequency resource of the PDSCH, or
a modulation and coding scheme of the PDSCH.

15. The UE of claim 1, wherein the one or more parameters of the PDCCH or the one or more parameters of the PDSCH, in addition to the location of the CCE of the PDCCH and the PRI bitfield of the PDCCH, indicate a PUCCH resource for which the PUCCH repetition factor is configured.

16. A base station for wireless communication, comprising:
at least one processor; and
at least one memory communicatively coupled with the at least one processor and storing processor-readable code that, when executed by the at least one processor, is configured to cause the base station to:
transmit a physical downlink control channel (PDCCH) scheduling a physical downlink shared channel (PDSCH) and indicating a physical uplink control channel (PUCCH) repetition factor, wherein the PUCCH repetition factor is indicated by a combination of a location of a control channel element (CCE) of the PDCCH, a PUCCH resource indicator (PRI) bitfield of the PDCCH, and at least one of: one or more parameters of the PDCCH or one or more parameters of the PDSCH, wherein the PUCCH repetition factor indicates a number of times that a PUCCH is to be transmitted; and
receive a plurality of repetitions of the PUCCH based on the PUCCH repetition factor.

17. The base station of claim 16, wherein the at least one of: the one or more parameters of the PDCCH or the one or more parameters of the PDSCH comprises the one or more parameters of the PDCCH, and wherein the one or more parameters of the PDCCH include at least one of:
an aggregation level of the PDCCH,
a cell radio network temporary identifier used to mask a cyclic redundancy check of the PDCCH,
a demodulation reference signal (DMRS) sequence of the PDCCH, or
a DMRS port of the PDCCH.

18. The base station of claim 16, wherein the PUCCH carries an acknowledgment or a negative acknowledgment for the PDSCH.

19. The base station of claim 16, wherein, to cause the base station to receive the plurality of repetitions of the PUCCH based on the PUCCH repetition factor, the processor-readable code, when executed by the at least one processor, is configured to cause the base station to receive the plurality of repetitions of the PUCCH based on the PUCCH repetition factor until an indication of a different PUCCH repetition factor, associated with a different PUCCH, is received.

20. The base station of claim 16, wherein, to cause the base station to receive the plurality of repetitions of the PUCCH based on the PUCCH repetition factor, the processor-readable code, when executed by the at least one processor, is configured to cause the base station to receive repetitions of a group of PUCCHs, including the plurality of repetitions of the PUCCH, based on the PUCCH repetition factor until an expiration time has elapsed.

21. The base station of claim 16, wherein the PUCCH carries an acknowledgment or a negative acknowledgment (ACK/NACK) associated with semi-persistent scheduling (SPS) signaling.

22. The base station of claim 21, wherein the at least one memory further stores processor-readable code that, when executed by the at least one processor, is configured to cause the base station to:
transmit, prior to receiving the plurality of repetitions of the PUCCH, an SPS configuration indicating a mapping between: the PUCCH repetition factor, and the one or more parameters of the PDCCH, the location of the CCE, and the PRI bitfield.

23. The base station of claim 21, wherein a mapping between:
the PUCCH repetition factor, and
the one or more parameters of the PDCCH, the location of the CCE, and the PRI bitfield,
is the same for the PUCCH carrying the ACK/NACK associated with SPS signaling as for a PUCCH carrying an ACK/NACK for the PDSCH.

24. The base station of claim 21, wherein the at least one memory further stores processor-readable code that, when executed by the at least one processor, is configured to cause the base station to:
transmit, prior to receiving the plurality of repetitions of the PUCCH, an SPS configuration indicating a mapping between: the PUCCH repetition factor, and the one or more parameters of the PDSCH, the location of the CCE, and the PRI bitfield.

25. The base station of claim 21, wherein a mapping between:

the PUCCH repetition factor, and the one or more parameters of the PDSCH, the location of the CCE, and the PRI bitfield, is the same for the PUCCH carrying the ACK/NACK associated with SPS signaling as for a PUCCH carrying an ACK/NACK for the PDSCH.

26. The base station of claim 16, wherein the PUCCH is associated with a scheduling request.

27. The base station of claim 16, wherein the PUCCH carries channel state information (CSI).

28. The base station of claim 27, wherein the at least one memory further stores processor-readable code that, when executed by the at least one processor, is configured to cause the base station to:

transmit, prior to receiving the plurality of repetitions of the PUCCH, a CSI report setting indicating a mapping between: the PUCCH repetition factor, and the one or more parameters of the PDCCH, the location of the CCE, and the PRI bitfield.

29. The base station of claim 27, wherein the at least one memory further stores processor-readable code that, when executed by the at least one processor, is configured to cause the base station to:

transmit, prior to receiving the plurality of repetitions of the PUCCH, a CSI report setting indicating a mapping between: the PUCCH repetition factor, and the one or more parameters of the PDSCH, the location of the CCE, and the PRI bitfield.

30. The base station of claim 16, wherein the one or more parameters of the PDSCH include at least one of:

a time resource of the PDSCH, a frequency resource of the PDSCH, or a modulation and coding scheme of the PDSCH.

* * * * *